UNITED STATES PATENT OFFICE.

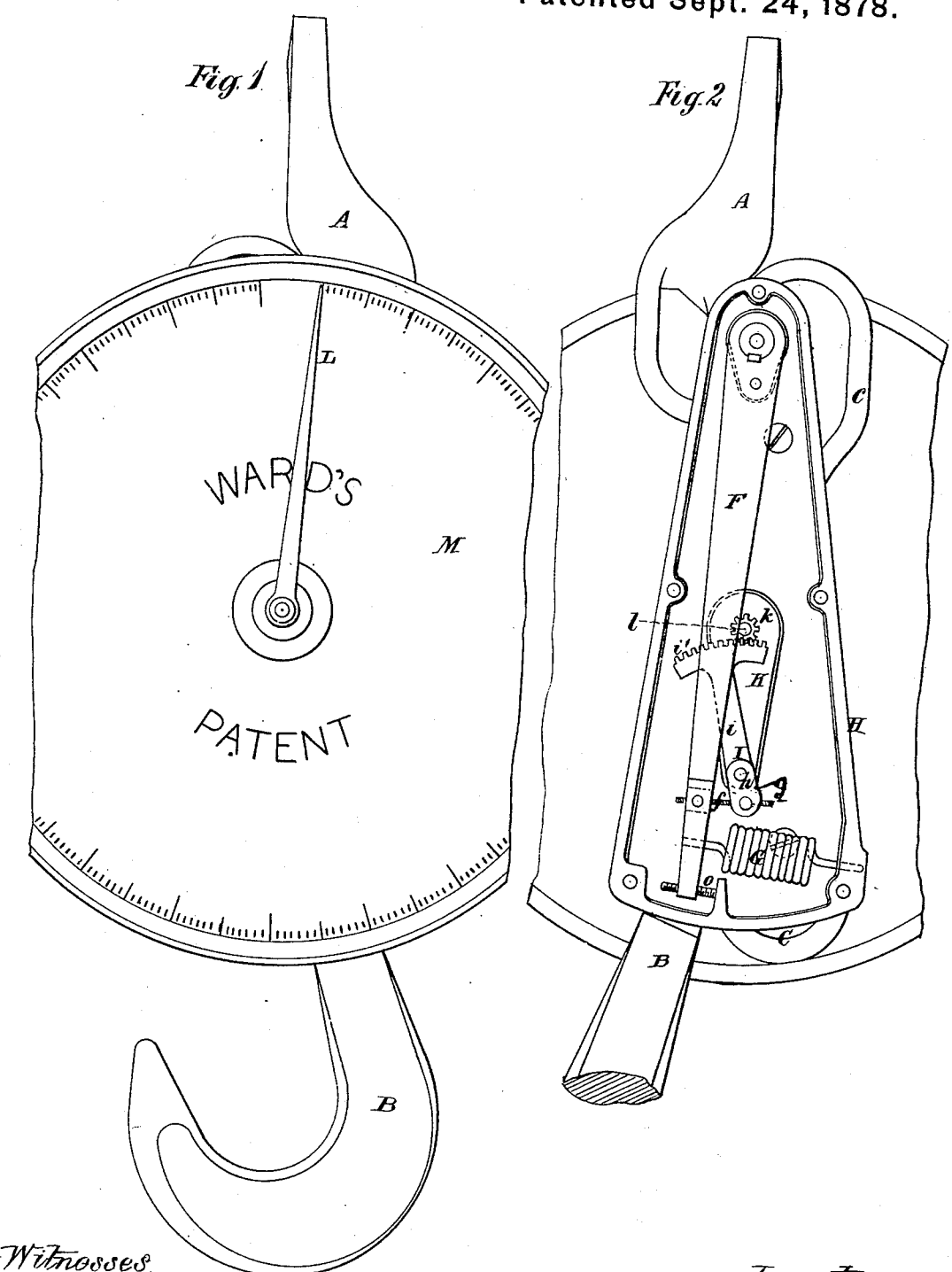

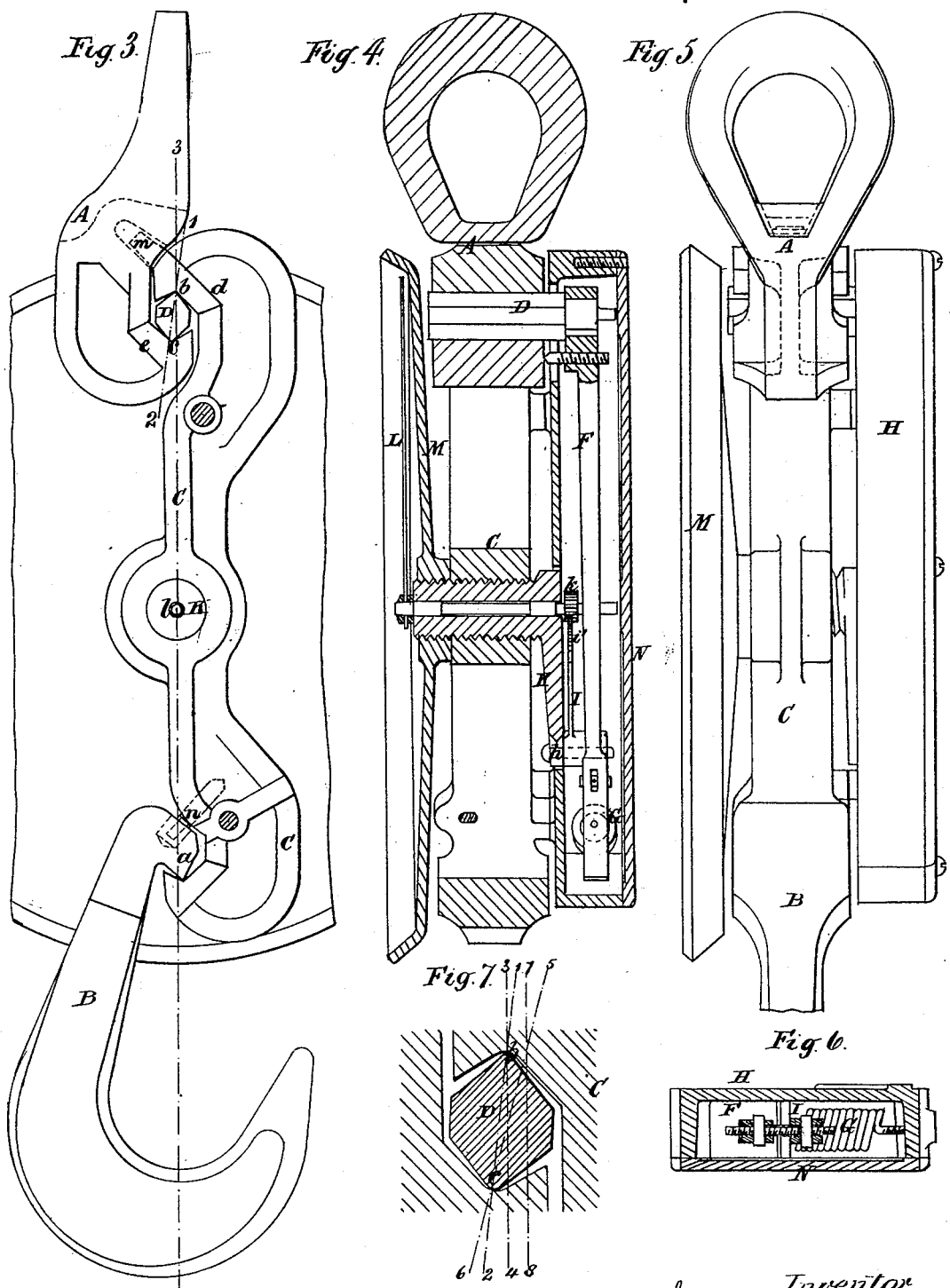

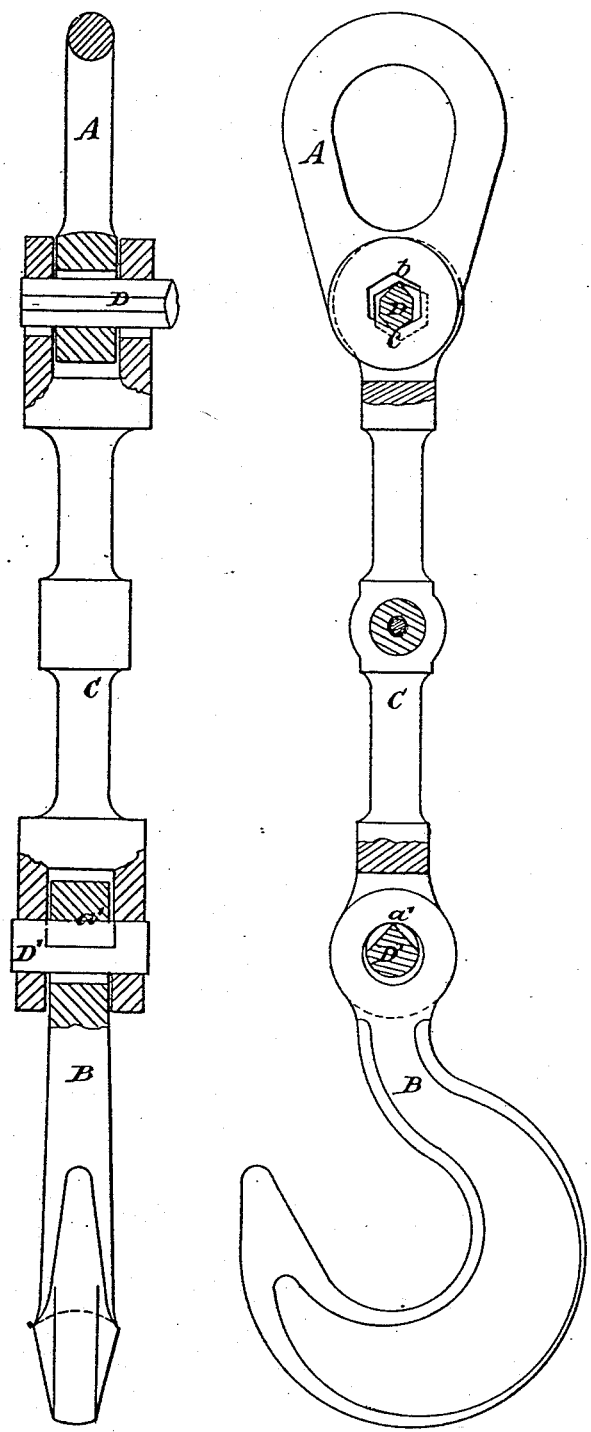

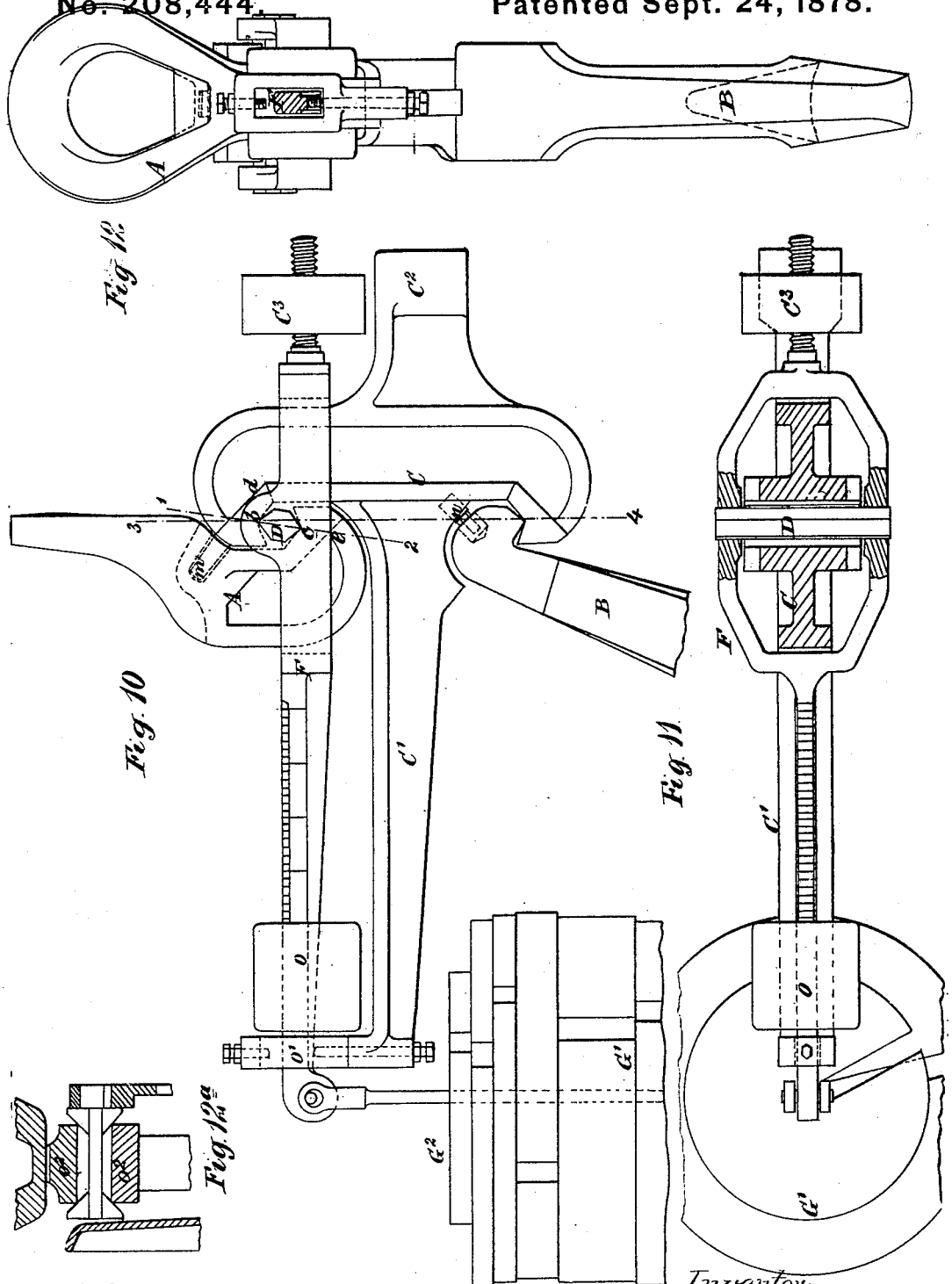

THOMAS H. WARD, OF SMETHWICK, NEAR BIRMINGHAM, ENGLAND.

IMPROVEMENT IN WEIGHING-SCALES.

Specification forming part of Letters Patent No. 208,444, dated September 24, 1878; application filed May 27, 1878.

*To all whom it may concern:*

Be it known that I, THOMAS HENRY WARD, of Smethwick, near Birmingham, in the county of Stafford and Kingdom of England, have invented Improvements in Machinery or Apparatus for Ascertaining and Indicating Weight, of which the following is a specification:

My said invention relates to suspension weighing apparatus of that description in which the weight of a load is ascertained by weighing a proportion or component part thereof, and thence determining the total weight upon the principle of the parallelogram of forces; and my said invention has for its object the production of a suspension apparatus, more especially intended to be used in combination with cranes, which shall be self-contained, simple, compact, and powerful, and economical in its construction, and the whole of the parts of which shall be comprised within a limited space or compass.

In carrying out my said invention, in order to effect these objects I connect the shackle or suspension device by which the apparatus is supported with the hook or suspending device which carries the load to be weighed by means of a frame constituting the body of the machine, the upper end of which is attached to the said shackle or suspension device by a rocker formed on its upper and lower sides with knife-edges, and made of the minimum height practicable, so as to perform, in addition to its function as a rocker, that of a pin or key for connecting the parts together, while the lower end of the said frame is either attached to the hook or suspending device by a pin formed with a knife-edge, so as to insure that the frame or body of the machine is always suspended in a constant vertical position, or by the hook or suspending device being itself provided with a knife-edge engaging with the frame for a like purpose.

The rocker is placed at an angle—that is to say, so that a line drawn through its knife-edges will be inclined to the vertical plane; but the parts are so arranged that the rocker, in its normal condition, while still being inclined, shall approximate as closely as practicable to a vertical position—say at an angle of about five degrees. To the rocker is fixed or fitted a lever-arm, which is connected directly, at or near its lower or outer end, to a spring-balance, and is also attached, by preference, at a point situate intermediate between its fulcrum and its lower extremity, to a vibrating lever mounted on a fixed center and carrying a toothed segment, which imparts motion, through the intervention of a pinion, to a pointer, for indicating upon a dial the weight of the load to be ascertained.

The spindle of the pinion, and which also carries the pointer, passes through a hole in a bracket, carrying the indicating-gear, which bracket is screwed into the vertical frame; or, if preferred, it may be arranged at the side of the frame. The bracket also serves to secure the dial to the machine, while an arm of the bracket, which carries the fulcrum of the quadrant, with its appendages, projects through into a fixed box, provided for the purpose of protecting the whole of the working parts.

The apparatus operates in the following manner: When a load is attached to the hook the rocker, which is normally somewhat inclined, is caused to turn slightly on its lower knife-edge, and the load is deflected, (the degree of such motion and deflection varying in proportion to the amount of the load, but being so arranged as to be as small as it is practically possible—for example, say in a one-ton machine one-fifty-fifth of an inch,) and as the lever-arm works in unison with the rocker the former is also caused to turn, thereby elongating the spring of the balance by an amount greater than the deflection in the rocker in the proportion to the increased leverage of the lever over the tumbler, and at the same time imparting motion to the vibrating-lever segment, which actuates the pointer, and causing the said lever to describe a longer arc than the lever-arm, so as to obtain a maximum or augmented stroke of the pointer upon the dial, for the facility of reading the indications.

It will thus be seen that, in lieu of weighing the load upon the principle of the lever, as is customary in weighing-machines, it is weighed upon a combination of the principles of the lever and the parallelogram of forces; and that, as the degree of deflection varies with the load and is resisted by the spring, the arc which the lever-arm has described when it arrives at its position of rest with the load and the spring *in equilibrio* will be in proportion to the amount of deflection, and consequently to the weight of the load. By suitably graduating, therefore, the dial and proportioning the dimensions of the several moving parts, the total weight of the load will be ascertained upon the principle before described.

A weight or weights, or other equivalents, may be substituted for the spring-balance, and the vibrating-lever segment, pinion, dial and pointer, and appendages may be dispensed with, the weight of the load being ascertained by the addition of or the sliding of weights, or both, after the manner of weighing with ordinary levers; and in order that my said invention may be fully understood I shall now proceed more particularly to describe the same, and for that purpose shall refer to the several figures on the annexed sheets of drawings, the same letters of reference indicating corresponding parts in all the figures.

Figures 1 to 7 of the accompanying drawings illustrate one modification of apparatus for ascertaining and indicating weight, constructed according to my said invention, Fig. 1 being a front elevation; Fig. 2, a back elevation, with the cover removed; Figs. 3 and 4, Sheet 2, longitudinal and transverse sectional elevations; Fig. 5, an end view; Fig. 6, a sectional plan through the box only, corresponding to Fig. 2; and Fig. 7, an enlarged detail of the rocker and the contiguous portions of the frame and shackle. Figs. 8 and 9, Sheet 3, illustrate, in transverse and longitudinal sectional elevation, another arrangement of shackle, frame, and hook in accordance with my said invention; and Figs. 10, 11, and 12, Sheet 4, illustrate a further modification, Fig. 10 being a front elevation, Fig. 11 a sectional plan, and Fig. 12 an end elevation, of the same. Fig. 12$^a$ is a transverse sectional elevation, illustrating another modification of the rocker.

Referring to the arrangement illustrated by Figs. 1 to 7, A is the shackle or suspension device by which the apparatus is supported, and B is the hook or suspending device for carrying the load to be weighed, the two parts being connected together by means of a frame, C, which, at its upper end, is attached to the shackle A by a rocker, D, and at its lower end carries the hook B, formed with a knife-edge at $a$, in order to insure that this frame shall be always suspended in a constant vertical position. The rocker D, which is formed with knife-edges on its upper and lower sides at $b$ $c$, respectively, is made of the minimum height practicable, so as to admit of it being utilized as the means of connecting the frame C and shackle A together without the aid of additional pins, the rocker itself constituting the pin for uniting the two parts, which are made of a hook shape at $d$ $e$ to engage with the knife-edges $b$ $c$, respectively.

The rocker D is placed at an angle—that is to say, so that a line, 1 2, drawn through the knife-edges $b$ $c$ will be inclined to the vertical plane 3 4; but the parts are so arranged that the rocker, in its normal condition while being inclined, shall approximate as closely as practicable to a vertical position. To the rocker D is fixed or fitted a lever-arm, F, which is connected near its lower end to one extremity of a spring, G, the opposite extremity of which is secured to one of the sides of a box, H, in which the various operating parts or gear are located; and at a point above the spring G there is attached to the said lever-arm F, by means of a rod, $f$, one arm, $g$, of a double-armed vibrating lever, I, which is mounted on a fixed center at $h$ in a bracket, K, screwed into the frame C. This vibrating lever is provided on its other arm, $i$, with a toothed segment, $i'$, engaging with a pinion, $k$, mounted on one end of a spindle, $l$, which passes through the boss of the bracket K, and carries at its opposite end a pointer, L, for indicating the weight of the load to be ascertained upon the dial M, carried by the bracket K.

The frame C is provided at its upper end with a projection, $m$, engaging with a recess in the shackle A, for the purpose of preventing any liability of the accidental disengagement of these parts of the machine, and the lower part of the frame is provided with a screwed pin, $n$, engaging with a recess in the hook B for a like purpose.

The lever-arm F is fitted with a stop, $o$, for limiting its motion in both directions, and also for protecting the spring from undue strain, which stop is adjustable, in order to admit of the position of the lever being regulated in setting the apparatus.

The opposite ends of the spring G and of the screw-rod $f$ are formed with right and left hand screw-threads for facilitating the adjustment of their proper connections.

It is preferred to make the working-edges $b$ $c$ of the rocker D slightly rounded, as shown in the enlarged detail, Fig. 7, in lieu of forming them to a sharp angle.

By constructing, however, the rocker of the best steel, with hardened knife-edges, the latter may be made sharper than would be otherwise admissible without the liability of their being unduly flattened in wear.

The box H, which contains the whole of the gear or working parts, is represented as attached to the frame C, and a cover, N, is provided, which closes the box.

The operation of weighing is carried out in the following manner: The apparatus being by its shackle or suspension device A fixed to or suspended from any body or support, the load to be weighed is attached to the hook B, the point of suspension of which, at $a$, is in the vertical line 3 4 passing through the upper knife-edge, $b$, of the rocker D. When the load is attached to the hook the rocker D, which is normally somewhat inclined, is, by the weight of the load, caused to turn slightly to the right on the bearing of its knife-edge, at $c$, in the shackle A, into the position indicated by the dotted line 5 6 in Fig. 7, and the load, which still depends vertically from the knife-edge $b$, has thus been deflected to an infinitesimal extent, which is represented (slightly exaggerated) by the distance between the vertical line 3 4 and the vertical line 7 8 in Fig. 7, the degree of the motion of the rocker and of the deflection of the load varying in proportion to the amount of the load. As the lever-arm F works in unison with the rocker D, it follows that the former is also caused to turn, thereby elongating the spring G by an amount exceeding that of the deflection of the rocker in proportion to the increased leverage of the lever over the rocker, the resistance of the spring being received by the lever in its functions as a lever rather than of a pendulous arm. At the same time motion is imparted to the vibrating lever I, the segment $i'$ of which actuates the pinion $k$ for transmitting motion to the pointer L, the arc described by the segment $i'$ being still greater than that described by the lever-arm F, so that with a minimum or minute deflection of the rocker D there is obtained by the arrangement and combination of gear hereinbefore described a maximum or augmented stroke of the pointer L upon the dial M, and the reading of the indications is accordingly facilitated.

It will thus be seen that, in lieu of weighing the load upon the principle of the lever, as in ordinary weighing-machines, in the apparatus constructed in accordance with my said invention it is weighed upon a combination of the principles of the lever and the parallelogram of forces, and that, as the degree of deflection in the rocker varies with the load and is resisted by the spring, the arc which the lever-arm F has described when it arrives at its position of rest with the load and the spring *in equilibrio* will be in proportion to the amount of deflection, and consequently to the weight of the load. By suitably graduating, therefore, the dial M, and proportioning the dimensions of the several moving parts, the total weight of the load will be ascertained upon the principles hereinbefore described.

In the modification illustrated by Figs. 8 and 9, the frame C is made bifurcated at its opposite ends to embrace the shackle A and the hook B, respectively, the rocker D serving as the connecting-pin between the shackle A and the frame C, as before, while the hook B is also attached to the frame by a pin, D', shaped to a knife-edge at $a'$. The other parts of the apparatus not shown in the drawings, Figs. 8 and 9, are similar to those of the apparatus hereinbefore described with reference to Figs. 1 to 7. The mode of connecting the hook to the frame by means of a pin formed with a knife-edge, as shown in Figs. 8 and 9, may also be adapted to the arrangement of frame shown in Figs. 1 to 7 of the drawings.

According to a further modification of my said invention, which is illustrated by Figs. 10, 11, and 12 of the drawings, the spring-balance G, segmental lever I, pinion $k$, pointer L, and dial M, and their appendages, are dispensed with, while the frame is shortened, and the lever F, which in this case is made of such a shape as to encircle or embrace the frame, and is arranged horizontally in lieu of vertically, and has suspended from its outer end weights $G^1$, which control the motion of the lever F when the rocker D is turned on the bearing of its lower knife-edge at $c$ under the weight of the load, the outer end of the lever being protected by an arm or bracket, $C^1$, extending from the frame C, and which carries the stop $o^1$, for controlling the deflection, and is balanced by a counter-weight at $C^2$. The lever F, at the opposite end to that at which the weights $G^1$ are suspended, is screw-threaded for the reception of an adjustable counter-weight, $C^3$, which, however, is not manipulated in connection with the operation of weighing.

In order to determine the weight of the load suspended from the hook B, weights are to be added at $G^2$ until the lever F is depressed onto the stop-pin $o^1$ of the projecting arm $C^1$. Then the balance-weights are to be adjusted until the lever rises; or the lever may be graduated, as shown, and the weight of the load ascertained by moving along it a sliding weight, O, until the lever starts from off its stop; or, in the case of heavy loads beyond the range of the graduated scale, the weight may be taken approximately by the addition of weights at $G^2$, and a nice adjustment of the lever F obtained by sliding the weight O.

Although I have shown this modification of the lever F and gear as applied to a frame, C, constructed and arranged in a similar manner to that of the apparatus illustrated by Figs. 1 to 7, it is obvious that the frame may be constructed, and may be connected to the shackle A and hook B, in the manner hereinbefore described with reference to Figs. 8 and 9 of my drawings, if preferred.

In the case of each modification care should be taken to have all working parts free of action, especially at the sides of the lever and shackle at $o^2$, and this will be better insured by recessing the rocker, as shown in Fig. $12^a$, so that the shackle-bearing and the frame-bearing will drop into position between its inclined recesses, and thus avoid the side rubbing-surfaces entailed in the arrangements previously described.

Having now described and particularly ascertained the nature of my said invention and the manner in which the same is or may be used or carried into effect, I would observe in conclusion that I do not intend to confine myself to the precise details and forms shown in the accompanying drawings, as it is obvious that the apparatus is susceptible of slight modification without altering the principle—as, for example, the dial may form the lid of the box by a slight rearrangement in the gear; the rocker may vibrate inward in lieu of outward, and it may be connected to a pair of levers instead of to one lever only. The shackle may be arranged as a fixture in lieu of hooking to a support, and the shape of the frame may be varied, and the normal inclination, and likewise the height of the rocking-pin, may also vary slightly; but What I consider to be novel and original, and therefore claim as the invention, is—

1. In a weighing-machine, the combination of the suspension device and the device which carries the load with an intermediate knife-edge rocker, the points of contact of which are on a line slightly inclined, but as nearly vertical as practicable, the movement of said rocker being resisted by a weight or spring, substantially as described.

2. In a weighing-machine, the combination of the suspension device and the frame carrying the load with an intermediate knife-edge rocker, the points of contact of which are on a line slightly inclined, but as nearly vertical as practicable, the said rocker being attached to a weighted or spring lever, through which the weight may be indicated, all substantially as set forth.

3. The combination of the suspension device, a hook, B, connecting-frame, and rocker D with a weighted or spring lever arm, F, and devices, substantially as described, for indicating the weight of the load.

4. The combination of the suspension device and the frame carrying the load with a rocker, D, lever F, spring G, lever I, provided with a toothed segment, the pinion $k$, and dial-pointer, as described.

In witness whereof I have signed my name to this specification in the presence of two subscribing witnesses.

T. H. WARD.

Witnesses:
   J. B. GOULD,
     *United States Consul, Birmingham.*
   J. FRANCIS BRAME,
     *United States Vice Consul.*